United States Patent
Bystedt

(10) Patent No.: US 12,089,766 B2
(45) Date of Patent: Sep. 17, 2024

(54) SHADE POCKET INSTALLATION DEVICE

(71) Applicant: Fredrik Bystedt, Los Angeles, CA (US)

(72) Inventor: Fredrik Bystedt, Los Angeles, CA (US)

(*) Notice: Subject to any disclaimer, the term of this patent is extended or adjusted under 35 U.S.C. 154(b) by 175 days.

(21) Appl. No.: 17/810,971

(22) Filed: Jul. 6, 2022

(65) Prior Publication Data

US 2023/0337847 A1 Oct. 26, 2023

Related U.S. Application Data

(60) Provisional application No. 63/363,330, filed on Apr. 21, 2022.

(51) Int. Cl.
*A47H 1/18* (2006.01)
*E04B 9/00* (2006.01)
*F16M 13/02* (2006.01)

(52) U.S. Cl.
CPC ............ *A47H 1/18* (2013.01); *E04B 9/006* (2013.01); *F16M 13/027* (2013.01)

(58) Field of Classification Search
CPC . A47H 1/18; A47H 5/00; E04B 9/006; F16M 13/027; E06B 9/323; E06B 9/42; E06B 9/17; Y10S 160/902
See application file for complete search history.

(56) References Cited

U.S. PATENT DOCUMENTS

| | | | | |
|---|---|---|---|---|
| 3,742,674 A * | 7/1973 | Lang | ............ | E04B 9/02 52/39 |
| 4,023,235 A | 5/1977 | Cohen | | |
| 9,206,603 B2 * | 12/2015 | Richardson | ............ | H02G 3/281 |
| 2023/0337847 A1 * | 10/2023 | Bystedt | ............ | E04B 9/006 |

FOREIGN PATENT DOCUMENTS

| | | | |
|---|---|---|---|
| DE | 102006005412 A1 | 8/2007 | |
| EP | 1617037 A1 | 1/2006 | |
| EP | 3524766 A1 | 8/2019 | |
| EP | 3599338 A1 | 1/2020 | |
| EP | 3524766 B1 * | 1/2021 | ......... E06B 9/1703 |
| JP | 3017854 B2 * | 3/2000 | |
| WO | 2019148219 A1 | 8/2019 | |

OTHER PUBLICATIONS

Knott, J. (Sep. 22, 2022). 'Game-Changing' Device Takes Worry Out of Pocketed Shade Installations. CEPRO. Retrieved Oct. 5, 2022, from https://www.cepro.com/BUSINESS-SUPPORT/SHADE-POCKET-BRACKET-CEDIA-EXPO/.
International Search Report and Written Opinion; PCT/US2022/039780; Mailed Dec. 9, 2022.

* cited by examiner

*Primary Examiner* — Andrew J Triggs
(74) *Attorney, Agent, or Firm* — Dunlap Bennett & Ludwig, PLLC; Anna L. Kinney

(57) ABSTRACT

A shade pocket installation device including a bracket, at least one slot on the bracket to fasten the bracket to a ceiling frame, at least one aperture on the bracket configured to fasten the bracket to a shade pocket, and a spacer configured to fit between the bracket and the shade pocket.

6 Claims, 5 Drawing Sheets

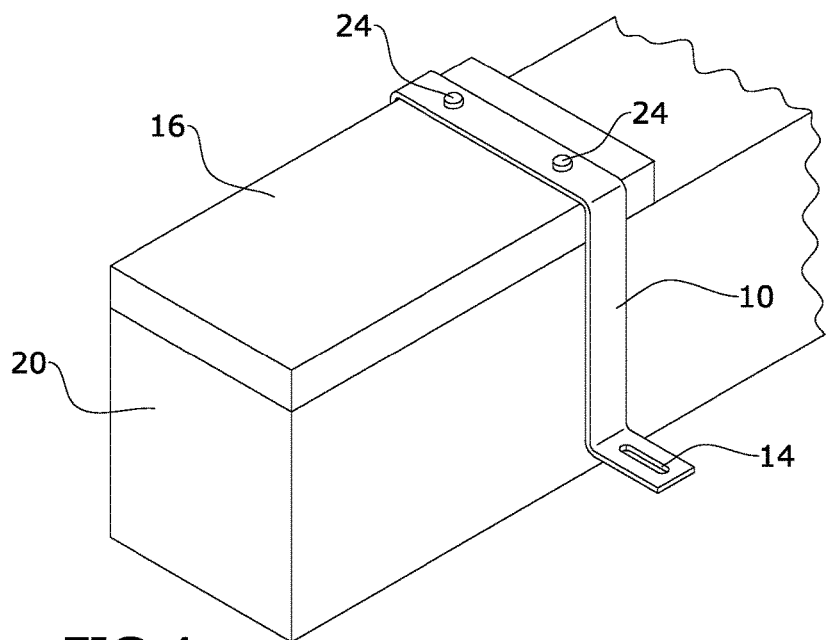
FIG.4
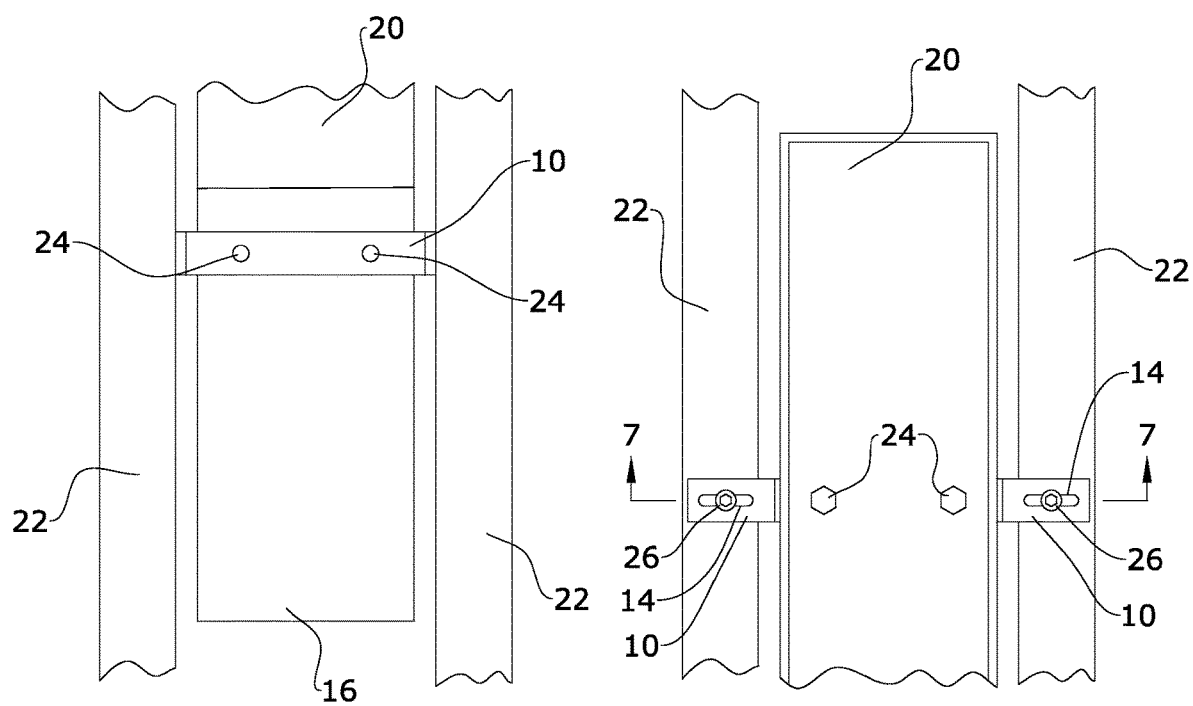
FIG.5
FIG.6

US 12,089,766 B2

SHADE POCKET INSTALLATION DEVICE

CROSS-REFERENCE TO RELATED APPLICATION

This application claims the benefit of priority of U.S. provisional application No. 63/363,330, filed Apr. 21, 2022, the contents of which are herein incorporated by reference.

BACKGROUND OF THE INVENTION

The present invention relates to shade pockets, and, more particularly, to installation devices therefor.

Installing motorized window shades is a large business, and most of the shades are being installed in shade pockets, such as aluminum shade pockets. Currently, shade pocket installation requires communication and coordination with third party framers for new construction builds, and a successful outcome is very much dependent on the framer's attention to detail. It requires multiple site visits to coordinate precise framing and correct installation method of the shade pockets.

Moreover, current shade pocket installation requires leveled lumber/framing backing which is often not accurately installed. This leads to frustrations by installers, additional costs, and loss of time and revenue. Several dealers experience the same problems with pocket installations.

As can be seen, there is a need for a device that enables simple shade pocket installation on a first visit with no follow up visits.

SUMMARY OF THE INVENTION

In one aspect of the present invention, a shade pocket installation device comprises a bracket, at least one slot on the bracket configured to fasten the bracket to a ceiling frame, at least one aperture on the bracket configured to fasten the bracket to a shade pocket, and a spacer configured to fit between the bracket and the shade pocket.

These and other features, aspects and advantages of the present invention will become better understood with reference to the following drawings, description, and claims.

BRIEF DESCRIPTION OF THE DRAWINGS

FIG. 4 is a top perspective of the shade pocket and the bracket thereof;

FIG. 5 is a top view of the shade pocket and the bracket thereof;

FIG. 6 is a bottom view of the shade pocket and the bracket thereof;

DETAILED DESCRIPTION OF THE INVENTION

Figure 1:
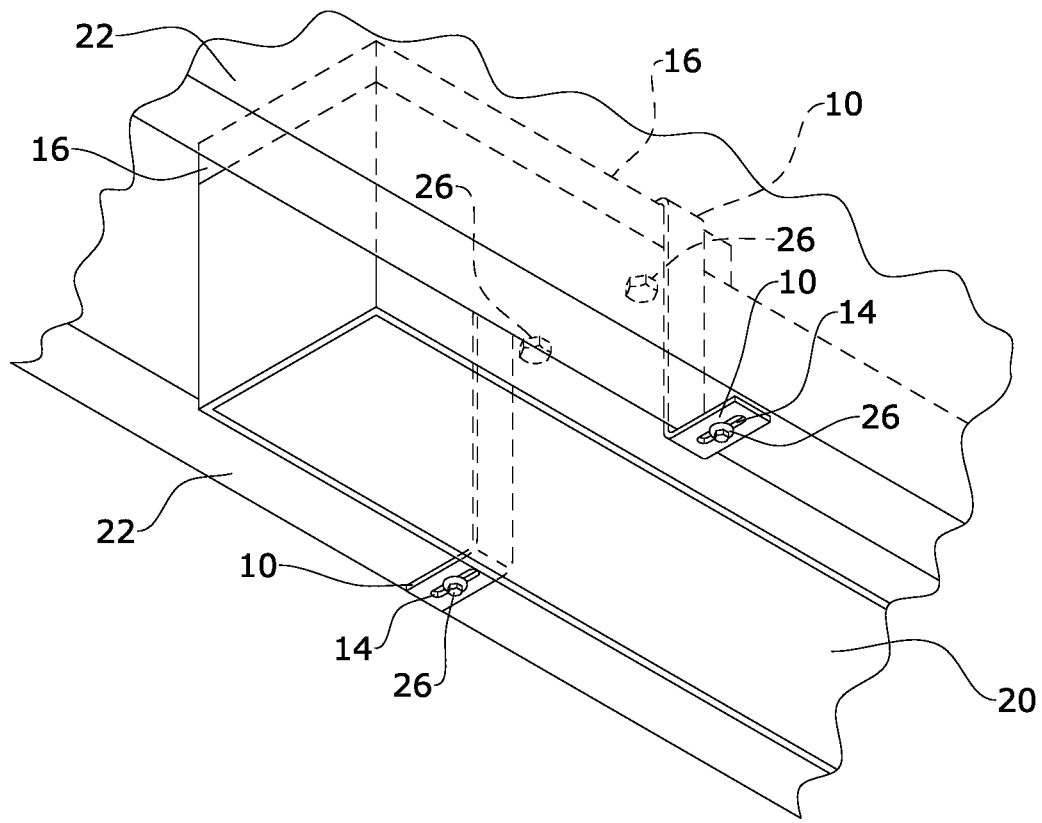
FIG. 1 is a bottom perspective view of a shade pocket installed in a ceiling frame by a bracket according to an embodiment of the present invention.
Figure 2:
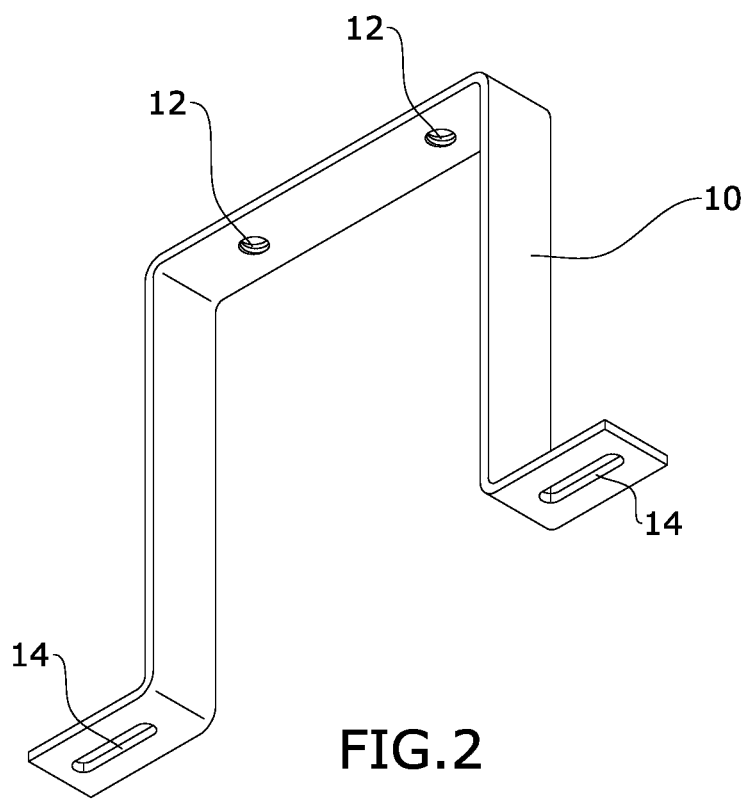
FIG. 2 is a bottom perspective view of the bracket thereof.
Figure 3:
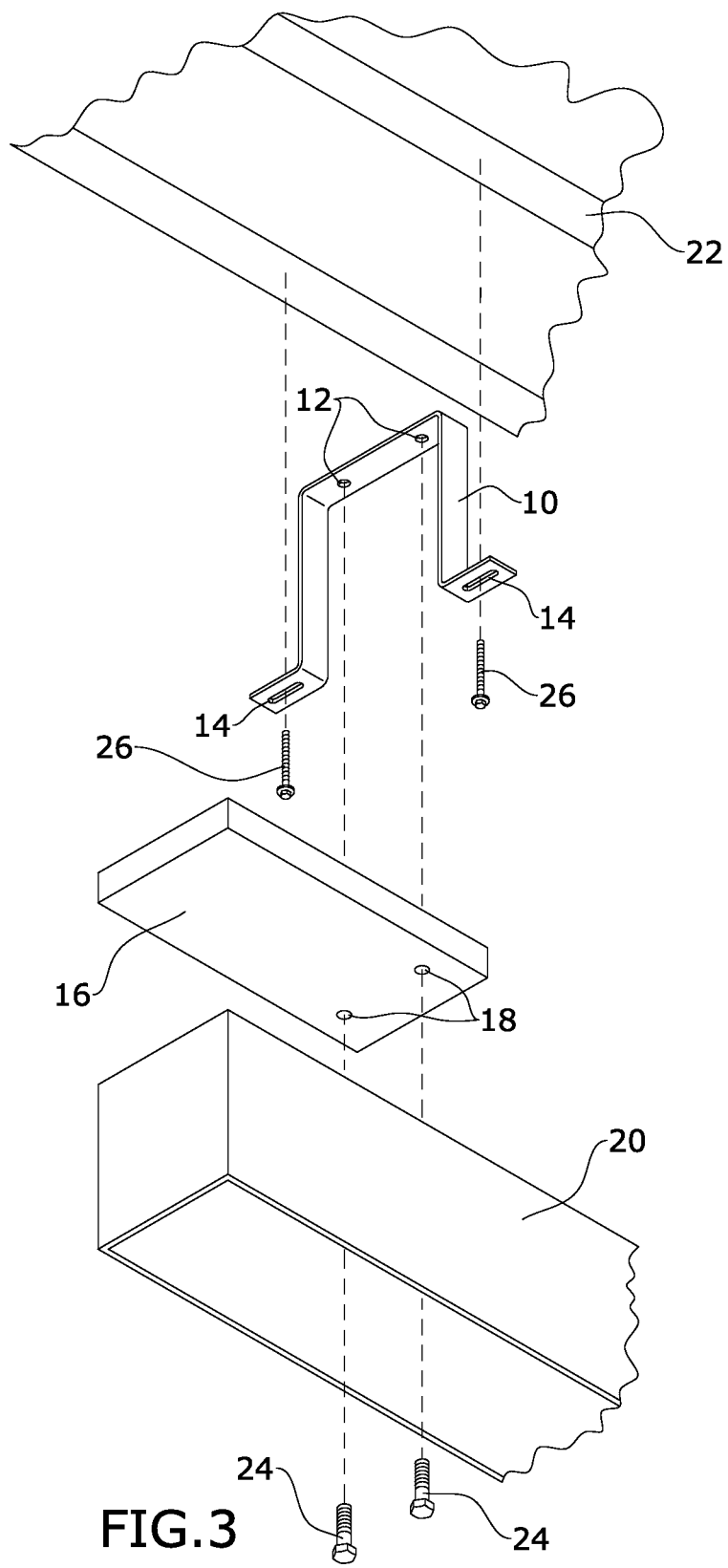
FIG. 3 is an exploded view of FIG. 1.
Figure 7:
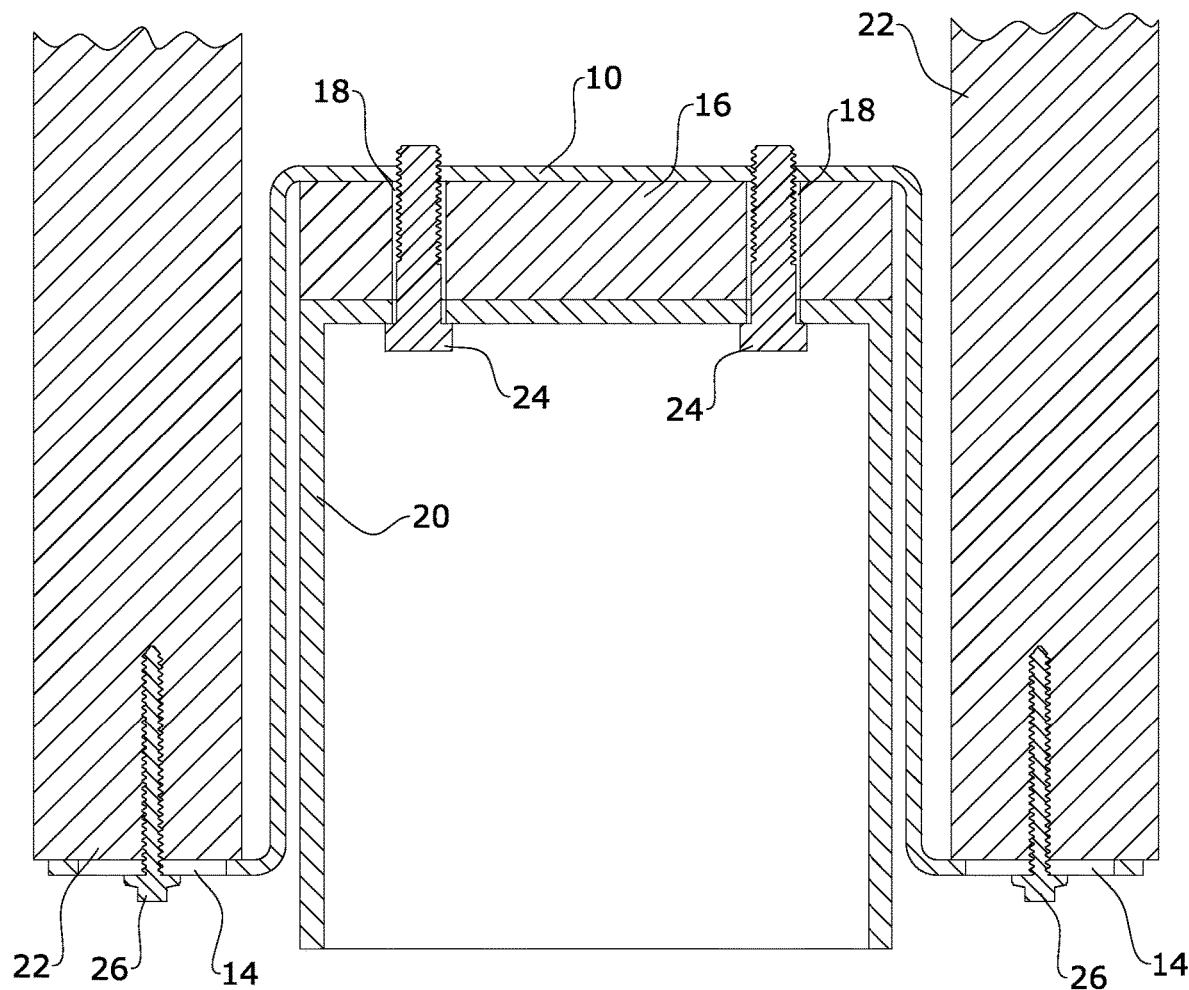
FIG. 7 is a sectional view taken on line 7-7 of FIG. 6.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

A general overview of the various features of the invention will be provided, with a detailed description following. Broadly, an embodiment of the present invention provides a device for shade pocket installation.

The device may comprise a bracket. The bracket may fit or conform to a shade pocket for installation of said shade pocket into a frame. The frame may be a ceiling frame or a framing.

In some embodiments of the present invention, the bracket may be a ⅛-inch-thick steel bracket with apertures on a top component. The top component may have two apertures. At least one fastener may utilize at least one aperture for securing the shade pocket to the bracket. The at least one fastener may be a bolt.

In some embodiments, the apertures may be pre-threaded apertures. For example, the apertures may be pre-threaded ⅜-inch apertures. These pre-threaded apertures may advantageously enable a user to avoid using nuts for tightening and enable for later removal, adjustments, and re-installation of the shade pocket.

In some embodiments, a spacer may work in conjunction with the bracket for installation of the shade pocket. The spacer may be a wood block. The spacer may level the or adjust a protrusion distance of the shade pocket installed in a ceiling frame in relationship to the ceiling. This enables edges on a bottom of the shade pocket to be appropriately or correctly spaced away from the ceiling. A user may then install a finish, such as a drywall, over the bracket, level with the ceiling for a seamless finished result. The spacer may also add back support when the shade pocket is mounted.

Fasteners may fasten the bracket to the spacer using the apertures in the top component of the bracket. The spacer may be fastened between the bracket and the shade pocket.

In some embodiments, the spacer may have pre-drilled holes. These pre-drilled holes may serve as a template for drilling pocket mounting holes in the shade pocket, ensuring holes in the shade pocket align with holes in the bracket and spacer.

In some embodiments, the shade pocket may protrude from the ceiling and may no longer be flush with the ceiling if, for example, the thickness of a finish on the ceiling changes. The shade pocket may be uninstalled, and a spacer may be added, adjusted, or replaced to adjust the height of the shade pocket in relationship to the ceiling. This will accordingly adjust the protrusion of the shade pocket. The pre-threaded apertures on the top component of the bracket may further enable easy uninstallation of the bracket.

In some embodiments, washers may be inserted between the bracket and a spacer for adjusting adjustment, spacing, or protrusion of the shade pocket from the ceiling.

In some embodiments, the bracket may comprise a top component with a first end and a second end. The top component may be positioned horizontally. A first side component may extend substantially perpendicular from the first end of the top component and connect the top component to a first bottom component. A second side component may extend substantially perpendicular from the second end of the top component and connect the top component to a second bottom component. The first bottom component and the second bottom component may be substantially parallel to the top component and extend away from a center of the bracket. The top component and the two side components of the bracket may form an upside-down U shape, configured to fit a shade pocket.

The first bottom component may extend from a first end of the upside-down U shape bracket. The second bottom component may extend from a second end of the upside-down U shape bracket. The bottom components may extend away from a center of the bracket.

The bottom components may include at least one slot, or slotted apertures, configured to fasten the bracket to a ceiling frame by means of at least one screw.

In some embodiments, a shade pocket installer may install two brackets onto the shade pocket and then anchor the shade pocket to the ceiling framing.

The present invention enables a shade pocket to be mounted in a few minutes, including bracket mounting. The installer may utilize a 7-9-inch-wide ceiling rafter framing gap for installation of the shade pocket. Advantageously, the present invention may not require a pocket support header when installing the pocket, avoiding any precise framing.

Referring now to FIGS. 1-10, a bracket 10 mounts a shade pocket 20 to a ceiling frame 22. The bracket 10 (best seen in FIG. 2) comprises two threaded apertures 12 and two slotted apertures 14.

A bolt 24 fits through apertures (not shown) in the shade pocket 20, through holes 18 in a spacer 16, and into threaded apertures 12 of the bracket 10, securing the bracket 10 to the shade pocket 20.

Figure 8:
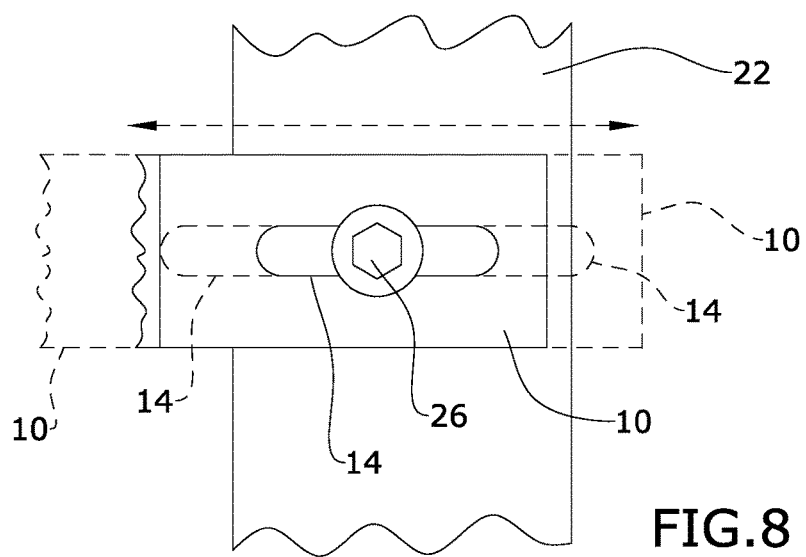
FIG. 8 is a bottom detail view of the bracket adjusted along the ceiling frame according to an embodiment of the present invention.

A screw 26 fits through a slotted aperture 14 on a bottom component of the bracket 10 to fasten the bracket 10 to the ceiling frame 22. As best seen in FIG. 8, a width of the slotted aperture 14 enables the bracket 10 to be adjusted along the ceiling frame 22.

Figure 9:
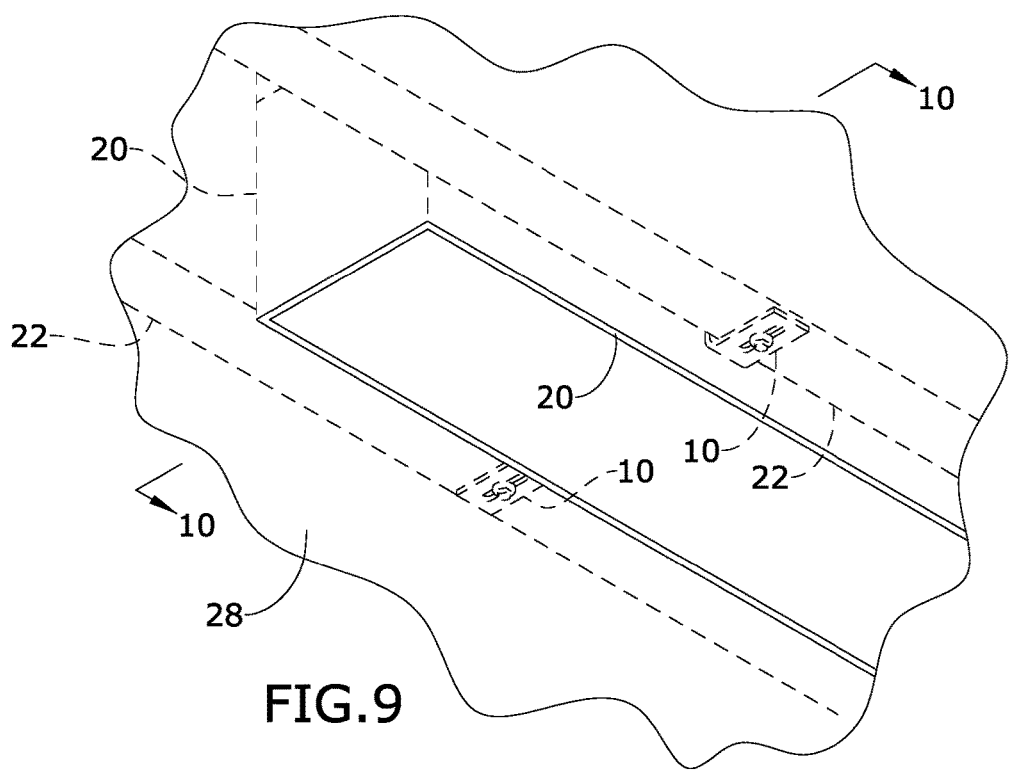
FIG. 9 is a perspective view of the shade pocket installed in a ceiling frame by the bracket with a drywall finish according to an embodiment of the present invention.
Figure 10:
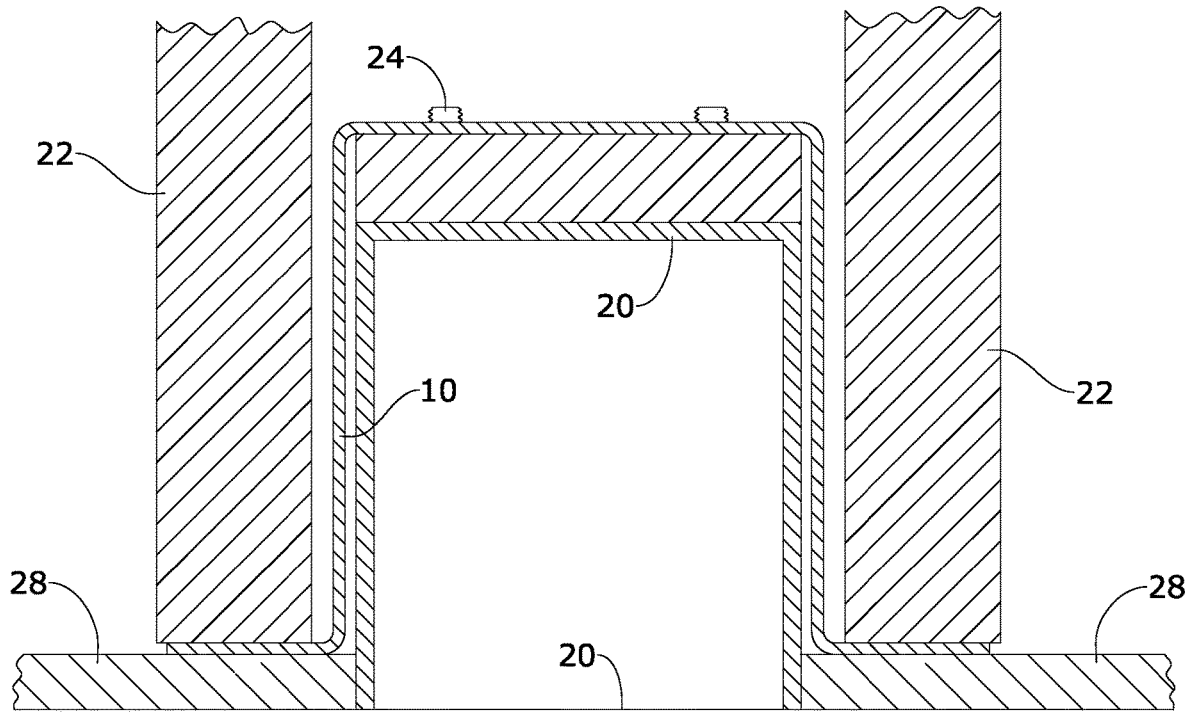
FIG. 10 is a sectional view taken on line 10-10 of FIG. 9.

Once the shade pocket 20 is installed in the ceiling frame 22, a drywall finish 28 may be added, concealing the bracket 10 from view of a user underneath the bracket 10 (as best seen in FIGS. 9 and 10).

It should be understood, of course, that the foregoing relates to exemplary embodiments of the invention and that modifications may be made without departing from the spirit and scope of the invention as set forth in the following claims.

What is claimed is:

1. A shade pocket installation device comprising:
   a bracket comprising a top component with a first end and a second end, a first side component substantially perpendicular to the top component and extending from the first end of the top component, a second side component substantially perpendicular to the top component and extending from the second end of the top component, a first bottom component substantially parallel with the top component and extending from the first side component away from a region between the first side component and the second side component, and a second bottom component substantially parallel with the top component and extending from the second side component away from the first bottom component;
   a first slot in the first bottom component configured to receive a first screw;
   a second slot in the second bottom component configured to receive a second screw;
   at least one fastener fastening a shade pocket to at least one aperture in the top component of the bracket; and
   a block positioned between the top component of the bracket and the shade pocket.

2. The shade pocket installation device of claim 1, wherein the at least one aperture in the top component of the bracket is a threaded aperture.

3. The shade pocket installation device of claim 1, wherein the block has at least one pre-formed aperture therein, configured to align with the at least one aperture.

4. The shade pocket installation device of claim 1, wherein the block extends along the shade pocket beyond a width of the bracket.

5. The shade pocket installation device of claim 1, wherein the block and the shade pocket have equal widths.

6. A shade pocket installation device, comprising:
   a bracket comprising a top component with a first end and a second end, a first side component substantially perpendicular to the top component and extending from the first end of the top component, a second side component substantially perpendicular to the top component and extending from the second end of the top component, a first bottom component substantially parallel with the top component extending from the first side component, and a second bottom component substantially parallel with the top component extending from the second side component;
   a first slot in the first bottom component configured to receive a first screw;
   a second slot in the second bottom component configured to receive a second screw;
   at least one fastener fastening a shade pocket to at least one aperture in the top component of the bracket; and
   a block positioned therebetween the top component of the bracket and the shade pocket;
   wherein the first screw fastens the first bottom component of the bracket to a ceiling frame and a second screw fastens the second bottom component of the bracket to the ceiling frame.

* * * * *